Patented Feb. 21, 1933

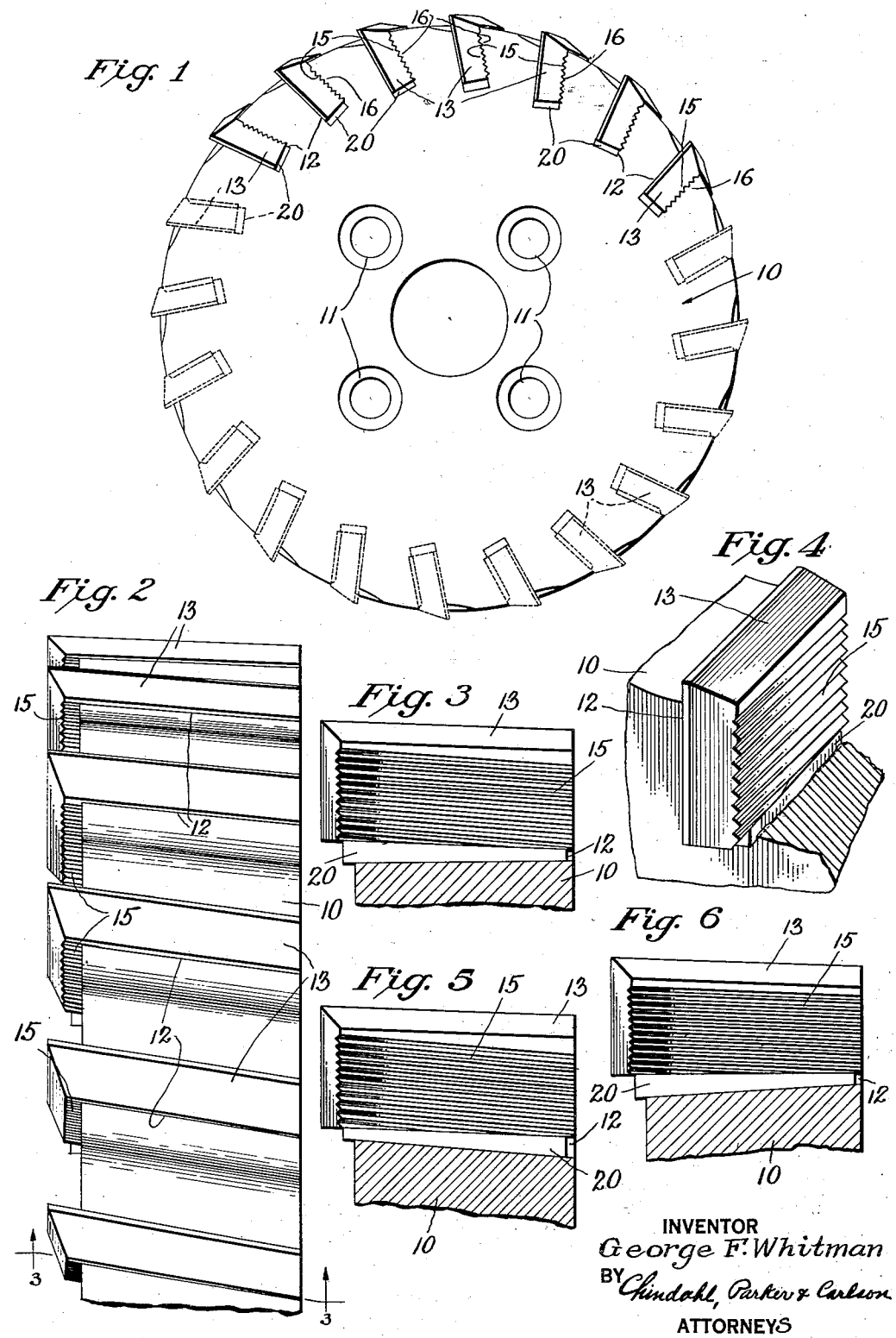

1,898,800

UNITED STATES PATENT OFFICE

GEORGE F. WHITMAN, OF ROCKFORD, ILLINOIS, ASSIGNOR TO BARBER-COLMAN COMPANY, OF ROCKFORD, ILLINOIS, A CORPORATION OF ILLINOIS

ROTARY CUTTER

Application filed December 12, 1931. Serial No. 580,644.

The invention relates generally to rotary cutters and more particularly to a cutter having adjustable cutting elements.

The general object of the invention is to provide a cutter of this character having novel means permitting adjustment of each cutting element in relatively small variable amounts or in larger uniform amounts.

Another object is to provide a cutter of this character having means on a side surface of the cutting element for holding it in the body of the cutter and means exerting a clamping pressure outwardly on the cutting element, said holding means being formed to distribute the clamping pressure over the entire area of said side surface.

A further object is to provide a cutter of this character in which complementary holding means are provided on adjacent surfaces of the cutting element and the body of the cutter and are integral therewith, and which has means bearing outwardly on the cutting element to exert a clamping pressure on said holding means.

Other objects and advantages will become apparent from the following description taken in connection with the accompanying drawing, in which:

Figure 1 is a face view of a cutter embodying the features of the invention.

Fig. 2 is an enlarged view of a portion of the periphery of the cutter.

Fig. 3 is a fragmentary sectional view taken along the line 3—3 of Fig. 2.

Fig. 4 is a perspective view of the portion of the cutter shown in Fig. 3.

Figs. 5 and 6 are views similar to Fig. 3 but of modified forms of cutters.

The preferred embodiment of the invention comprises generally a body having a plurality of outwardly opening slots. A cutting element is positioned in each slot, one side surface of the element and the adjacent surface of the body being formed with complementary means for holding the cutting element adjustably in spaced relation in the slot. Means is also provided exerting a pressure outwardly on the cutting element to rigidly clamp the latter in position of adjustment. The clamping means is formed to distribute the pressure over the entire area of one side surface of the element, and also to permit adjustment of the element radially of the cutter either in relatively small variable amounts or in larger uniform amounts.

As shown in the drawing, 10 indicates the body of the cutter which is cylindrical in form and is adapted to be mounted on a spindle (not shown) as by bolts (not shown) extending through holes 11 formed in the body 10.

Formed in the periphery of the body 10 and extending in a generally longitudinal direction of the cutter are a plurality of slots 12 which are preferably equally spaced and have a slight rake relative to the radius of the cutter.

Mounted in the respective slots 12 are a plurality of cutting elements or blades 13, each of which has a snug sliding fit with the slot and is adapted to be held in an intermediate position in the slot with the inner surface of the element 13 and the root or bottom surface of the slot spaced from each other.

To hold the element 13 in such intermediate position, complementary means are provided on one side surface of the element and the adjacent side surface of the slot respectively, which means are integral with the element and the body of the cutter to provide a rigid support for the element and to avoid the use of other, separate parts. Said means are constructed so that, when a clamping pressure is placed on the cutting element, said pressure is distributed over the entire area of said side surfaces to assure rigidity of the cutting element relative to the body of the cutter. Said complementary holding means are also arranged so that the cutting element may be adjusted outwardly of the body in small variable amounts or in larger amounts of predetermined uniform amounts.

As illustrated herein, said complementary holding means comprises a plurality of uniformly arranged serrations 15, preferably V-shaped, formed in one side surface, preferably the rear surface, of the cutting element, and engaging a plurality of complemental serrations 16 formed in the adjacent side surface of the slot, the snug fit of the element in the slot preventing the serrations 15 and 16 from disengaging in a direction perpendicular to said surfaces. The serrations 15 and 16 cover substantially the entire areas of the respective side surfaces in which they are formed so that, when the cutting element is clamped, the clamping pressure is uniformly distributed over said surfaces, and the V-shape of the serrations cause the cutting element to bear against the opposite side of the slot to hold the cutting blade rigid therein.

The serrations extend substantially longitudinally of the cutter and, since the serrations are uniformly arranged, adjustment of the cutting element outwardly of the cutter may be effected in predetermined uniform amounts by withdrawing the cutting element from the slot and re-inserting it with the serrations 15 moved laterally relatively to the serrations 16. Thus, adjustment may be effected in amounts equal to multiples of the distance between two adjacent serrations.

To effect an adjustment of less than the distance between two adjacent serrations, the latter are inclined slightly relative to the axis of the cutter so that, on longitudinal movement of the cutting element, a slight movement of the cutting element radially of the cutter will occur.

As mentioned above, means is also provided for exerting a pressure outwardly on the cutting element and transversely of the serrations 15 and 16 whereby the latter will be securely clamped to prevent relative movement thereof. To this end, the inner surface of the cutting element and the root surface of the slot, which are spaced apart, are formed at an angle to each other, and a wedge 20 is inserted therein, which exerts a pressure outwardly on the cutting element. The wedge is elongated to extend substantially along the entire inner surface of the cutting element to afford rigid support therefor. Thus, the clamping pressure is effected by a means lying solely under the cutting element rather than at one side thereof, and hence the cutting elements may be placed closely together, where desired.

While the inner surface of the cutting element and the root or bottom surface of the slot are at an angle to each other to provide for the wedge, these surfaces may be placed at various angles to the axis of the cutter. Thus, in Fig. 3, the inner surface of the element is at an angle to the axis, while the root surface of the slot is parallel thereto. In Fig. 5, both of said surfaces are inclined at different angles to the axis. In Fig. 6, the inner surface of the element is parallel to the axis, while the root surface of the slot is at an angle thereto.

From the above description, it will be apparent that the blade or cutting element is rigidly held in place by means formed integrally with the cutting element and the body respectively and adapted to distribute the clamping pressure over the entire areas of the side surface of the element and the adjacent surface of the slot. It is also apparent that the blade may be adjusted outwardly in relatively small variable amounts, on account of the angularity of the serrations 15 and 16 relative to the axis of the cutter, or in larger uniform amounts by reinserting the blade with the serrations thereon shifted laterally relative to the serrations on the body. The wedge effects an outward pressure on the cutting element, clamping the serrations 15 and 16 against each other, and their V-shape cause the cutting element to bear tightly against the opposite side surface of the slot.

I claim as my invention:

1. A rotary cutter comprising, in combination, a body having an outwardly opening slot extending substantially longitudinally of the axis of rotation and defined by opposed side and root surfaces, a cutting element positioned in said slot with its inner surface disposed at an angle to and spaced from said root surface, interengaging serrations formed on one of said side surfaces and on the adjacent side of said element to hold said element in an intermediate position in said slot, said serrations extending generally longitudinally of said axis and being slightly inclined to said axis to provide small radial adjustments of said element on longitudinal movement thereof and being of uniform shape and arrangement to permit insertion of the element in different intermediate positions in said slot to effect larger radial adjustments of said element, and an elongated wedge interposed between the inner surface of said element and said root surface for clamping the element in its adjusted position.

2. A rotary cutter comprising, in combination, a body having an outwardly opening slot extending substantially longitudinally of the axis of rotation and defined by opposed side surfaces and a root surface, one of said side surfaces being flat and the other being formed with serrations of uniform shape and spacing extending generally longitudinally of said axis, certain of said serrations extending from end to end of said other surface, a cutting element positioned in said slot with its inner surface disposed at an angle to and spaced from said root surface, a plurality of generally longitudinal serrations formed in one side of said element and complemental to and slidably interfitting with said first mentioned serrations, the other side of said element having a snug sliding fit against said flat surface, said element being adapted for insertion in different intermediate positions in said slot through different selective engagements of said coacting serrations to effect radial adjustments thereof, and an elongated wedge removably interposed between the inner surface of said element and said root surface for clamping said element in adjusted position and backing up said element in said position.

3. A rotary cutter comprising, in combination, a cylindrical body having a plurality of closely spaced outwardly opening slots in its periphery, each slot extending generally longitudinally of the axis of said cutter and being defined by parallel opposed side surfaces and a root surface, a plurality of like uniformly spaced serrations formed in one of said side surfaces and extending over substantially the entire area thereof, said serrations extending substantially longitudinally of said axis and being slightly inclined outwardly relative to said axis, the other of said side surfaces being flat, a generally flat cutting element positioned in said slot with its inner surface disposed at a slight angle to and spaced from said root surface, a plurality of generally longitudinal serrations formed in and extending over substantially the entire surface of one side of said element and complemental to and slidably interfitting with said first mentioned serrations, the other side of said element having a snug sliding fit against said flat surface of said slot, whereby said element may be adjusted into any radial position within the range of said serrations spaced from said root surface to expand or contract the peripheral cutting circle of said cutter, and an elongated flat wedge removably interposed between said root surface and said element to secure the latter rigidly in position of adjustment in said slot.

In testimony whereof, I have hereunto affixed my signature.

GEORGE F. WHITMAN.